(12) United States Patent
Nakazato

(10) Patent No.: US 9,081,523 B2
(45) Date of Patent: Jul. 14, 2015

(54) NON-TRANSITORY COMPUTER READABLE RECORDING MEDIUM STORING JOB TRANSMISSION PROGRAM FOR TRANSMISSION OF JOB TO ELECTRONIC DEVICE AND ELECTRONIC DEVICE EXECUTING JOB

(71) Applicant: Kyocera Document Solutions Inc., Osaka (JP)

(72) Inventor: Yosuke Nakazato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 4 days.

(21) Appl. No.: 14/280,850

(22) Filed: May 19, 2014

(65) Prior Publication Data

US 2014/0355030 A1 Dec. 4, 2014

(30) Foreign Application Priority Data

May 30, 2013 (JP) ................................ 2013-114694

(51) Int. Cl.
*G06K 15/00* (2006.01)
*G06F 3/12* (2006.01)
*H04N 1/00* (2006.01)

(52) U.S. Cl.
CPC .............. *G06F 3/1221* (2013.01); *G06F 3/126* (2013.01); *G06F 3/1285* (2013.01); *H04N 1/00885* (2013.01); *Y02B 60/1271* (2013.01)

(58) Field of Classification Search
None
See application file for complete search history.

(56) References Cited

U.S. PATENT DOCUMENTS

2002/0114004 A1* 8/2002 Ferlitsch ...................... 358/1.15
2004/0095599 A1* 5/2004 Guddanti ..................... 358/1.15
2009/0138878 A1* 5/2009 Fernstrom et al. ............ 718/102

FOREIGN PATENT DOCUMENTS

JP       2006-072236 A    3/2006
JP       2008-087353 A    4/2008

* cited by examiner

*Primary Examiner* — Jeremiah Bryar
(74) *Attorney, Agent, or Firm* — Studebaker & Brackett PC

(57) ABSTRACT

A non-transitory computer readable recording medium records a job transmission program for transmission of a job to an electronic device. The electronic device includes a job executable state and an energy saving state. The job transmission program includes the followings as processes that the computer executes: receiving a transmission instruction of a job; determining whether or not the job is set as an energy saving job that can save power consumption in the electronic device; acquiring a state of the electronic device; queuing, when the job is an energy saving job and the acquired state of the electronic device is the energy saving state, transmission of the energy saving job; and transmitting, when the state of the electronic device is changed from the energy saving state to the job executable state, the queued energy saving job to the electronic device.

5 Claims, 13 Drawing Sheets

NON-TRANSITORY COMPUTER READABLE RECORDING MEDIUM STORING JOB TRANSMISSION PROGRAM FOR TRANSMISSION OF JOB TO ELECTRONIC DEVICE AND ELECTRONIC DEVICE EXECUTING JOB

INCORPORATION BY REFERENCE

The present application claims priority under 35 U.S.C. §119 to Japanese Patent Application No. 2013-114694, filed May 30, 2013. The contents of this application are incorporated herein by reference in their entirety.

BACKGROUND

The present disclosure relates to non-transitory computer readable recording mediums that record a job transmission program for transmitting a job to an electronic device, and electronic devices that execute a job.

Electronic devices of some type are capable of state transition between a job executable state and an energy saving state. The job executable state is a state in which a job is executable. While, the energy saving state is a state in which power consumption is less than that in the job executable state. In another electronic device, when no job is executed for a specific time period in the job executable state, the state is changed to the energy saving state.

SUMMARY

A non-transitory computer readable recording medium according to the present disclosure stores a job transmission program that a computer executes. The job transmission program is a program for transmission of a job to an electronic device. The electronic device includes a job executable state and an energy saving state. The job executable state is a state in which the job is executable. The energy saving state is a state in which power consumption is less than that in the job executable state. The job transmission program includes the followings as processes that the computer executes: receiving a transmission instruction of a job; determining whether or not the job is set as an energy saving job that can save power consumption in the electronic device; acquiring a state of the electronic device; queuing, when the job is an energy saving job and the acquired state of the electronic device is the energy saving state, transmission of the energy saving job; and transmitting, when a state of the electronic device is changed from the energy saving state to the job executable state, the queued energy saving job to the electronic device.

An electronic device according to the present disclosure includes a job executable state and an energy saving state. The job executable state is a state in which a job is executable. The energy saving state is a state in which power consumption is less than that in the job executable state. The electronic device includes a job receiving section configured to receive the job and a job executing section configured to execute the job. When the job receiving section receives an energy saving job as the job where the electronic device is in the energy saving state, the job executing section queues execution of the energy saving job. The energy saving job is a job that can save power consumption of the electronic device. Further, the job executing section executes the queued energy saving job when a state of the electronic device is changed from the energy saving state to the energy executable state.

DETAILED DESCRIPTION

Embodiments of the present disclosure will be described below with reference to the accompanying drawings.

First Embodiment

Figure 1:
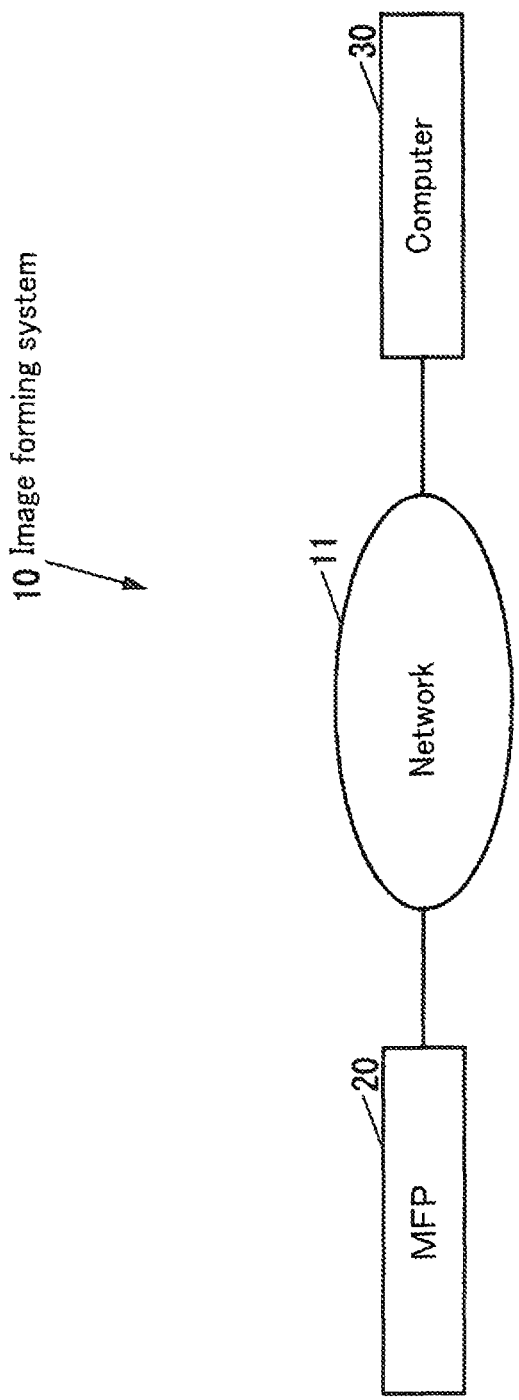
FIG. 1 shows a configuration of an image forming system according to the first embodiment of the present disclosure.

First of all, an image forming system 10 according to the first embodiment of the present disclosure will be described. FIG. 1 shows a configuration of the image forming system 10 according to the first embodiment.

As shown in FIG. 1, the image forming system 10 includes a multifunction peripheral (MFP) 20 as an electronic device and a computer 30, such as a personal computer (PC). The computer 30 transmits to the MFP 20 a print job that the MFP 20 is to execute. The MFP 20 and the computer 30 are connected together in a communicable manner through a network 11, such as a local area network (LAN), Internet, etc.

Figure 2:
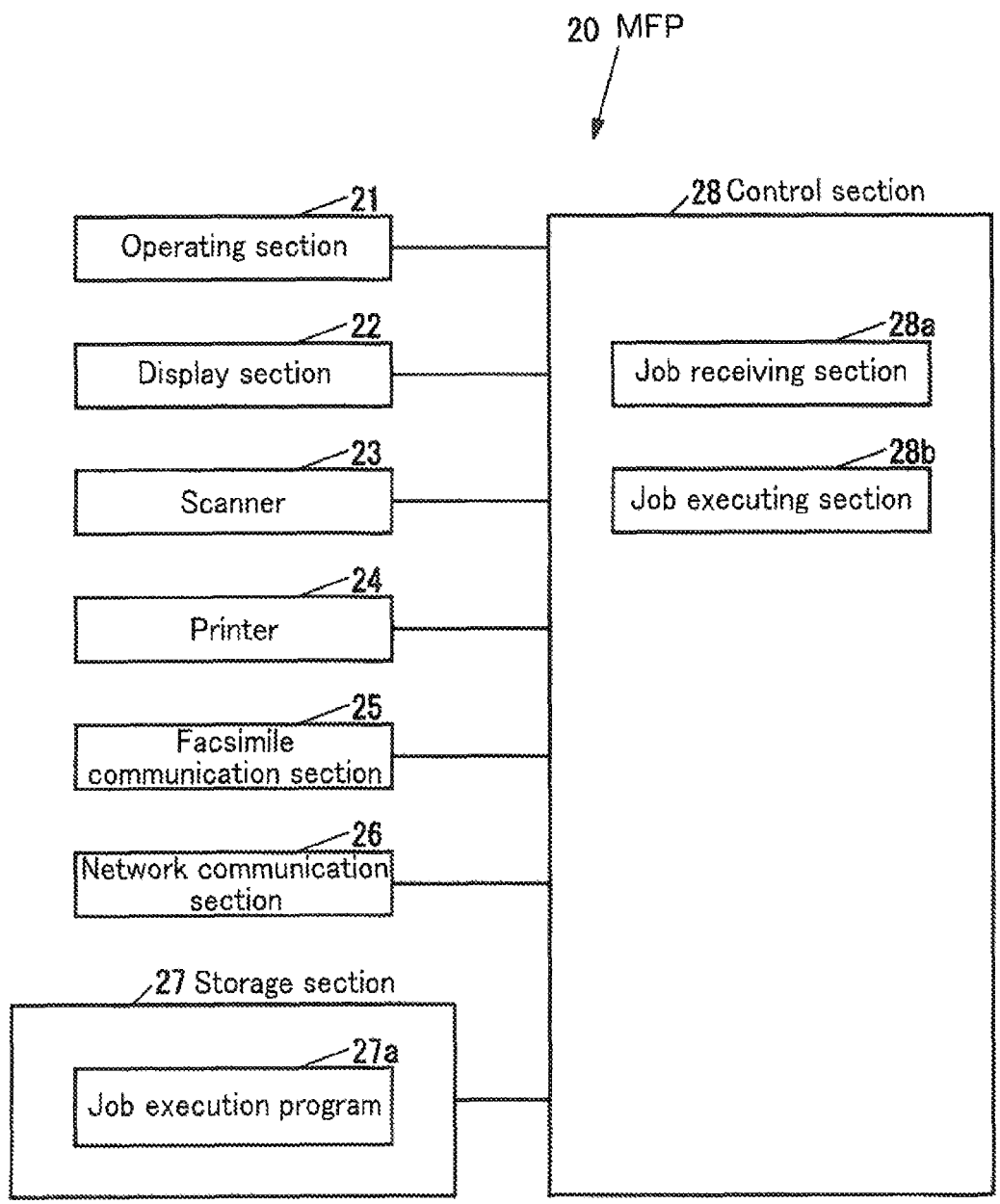
FIG. 2 shows a configuration of an MFP shown in FIG. 1.

FIG. 2 shows a configuration of the MFP 20. As shown in FIG. 2, the MFP 20 includes an operating section 21, a display section 22, a scanner 23, a printer 24, a facsimile communication section 25, a network communication section 26, a storage section 27, and a control section 28.

The operating section 21 is an input device, such as a button set. When the user manipulates the operating section 21, the MFP 20 executes processing corresponding to the manipulation. The user can make the MFP 20 to execute various types of processing through the operating section 21. The display section 22 is a display device, such as a liquid crystal display (LCD). The display device 22 displays a variety of information. The scanner 23 is a reading device to read an image from an original document. The printer 24 is a printing device to execute printing on a recording medium, such as paper. The facsimile communication section 25 is a faxing device that executes facsimile communication with an external facsimile machine (not shown) through a communication line, such as a public telephone line. The network communication section 26 is a network communication device that performs communication with an external device through the network 11 (see FIG. 1). The storage section 27 is a nonvolatile storage device, such as an electrically erasable programmable read only memory (EEPROM), a hard disk drive (HDD), or the like.

The storage section 27 stores various types of data. The control section 28 controls the entire MFP 20.

The MFP 20 is configured such that when no print job is executed for a specific time period in a print job executable state as a job executable state, the state is changed to an energy saving state. The print job executable state is a state in which a print job is executable. While, the energy saving state is a state in which power consumption is less than that in the print job executable state. In the first embodiment, the print job executable state includes a ready state and a printing state. The ready state is a state in which the MFP 20 is ready for preparation for execution of a print job. While, the printing state is a state in which a print job is being executed actually.

The print job is a job of printing an image on a recording medium by the printer 24. Examples of the print job may include a copy print job, a fax print job, and a data print job. The copy print job is a job of causing the printer 24 to print an image read from an original document by the scanner 23 on a recording medium. The fax print job is a job of causing the printer 24 to print a fax image received through the facsimile communication section 25 on a recording medium. The data print job is a job of causing the printer 24 to print an image based on print data received through the network communication section 26 on a recording medium.

The operating section 21 may be a touch panel formed in the display section 22. Alternatively, the operating section 21 may include an input device, such as a button set, together with the touch panel.

The storage section 27 stores a job execution program 27a for job execution. The job execution program 27a may be installed in the MFP 20 from a non-transitory computer readable recording medium that records the job execution program 27a in the manufacturing stage of the MFP 20. Alternatively, the job execution program 27a recorded on a non-transitory computer readable recording medium may be installed additionally in the MFP 20 through a storage medium, such as a universal serial bus (USB) memory, an SD card, etc. Or, the job execution program 27a recorded on a non-transitory computer readable recording medium may be installed additionally in the MFP 20 through the network 11. Such a non-transitory computer readable recording medium may be a compact disk (CD) or a digital versatile disk (DVD), for example.

The control section 28 includes, for example, a central processing unit (CPU), a read only memory (ROM), and a random access memory (RAM). The ROM stores a program and various types of data. The RAM is used as a work area for the CPU. The CPU executes a program stored in the ROM or the storage section 27.

The control section 28 executes the job execution program 27a stored in the storage section 27 to function as a job receiving section 28a and a job executing section 28b. The job receiving section 28a receives a job. The job executing section 28b executes a job.

Figure 3:
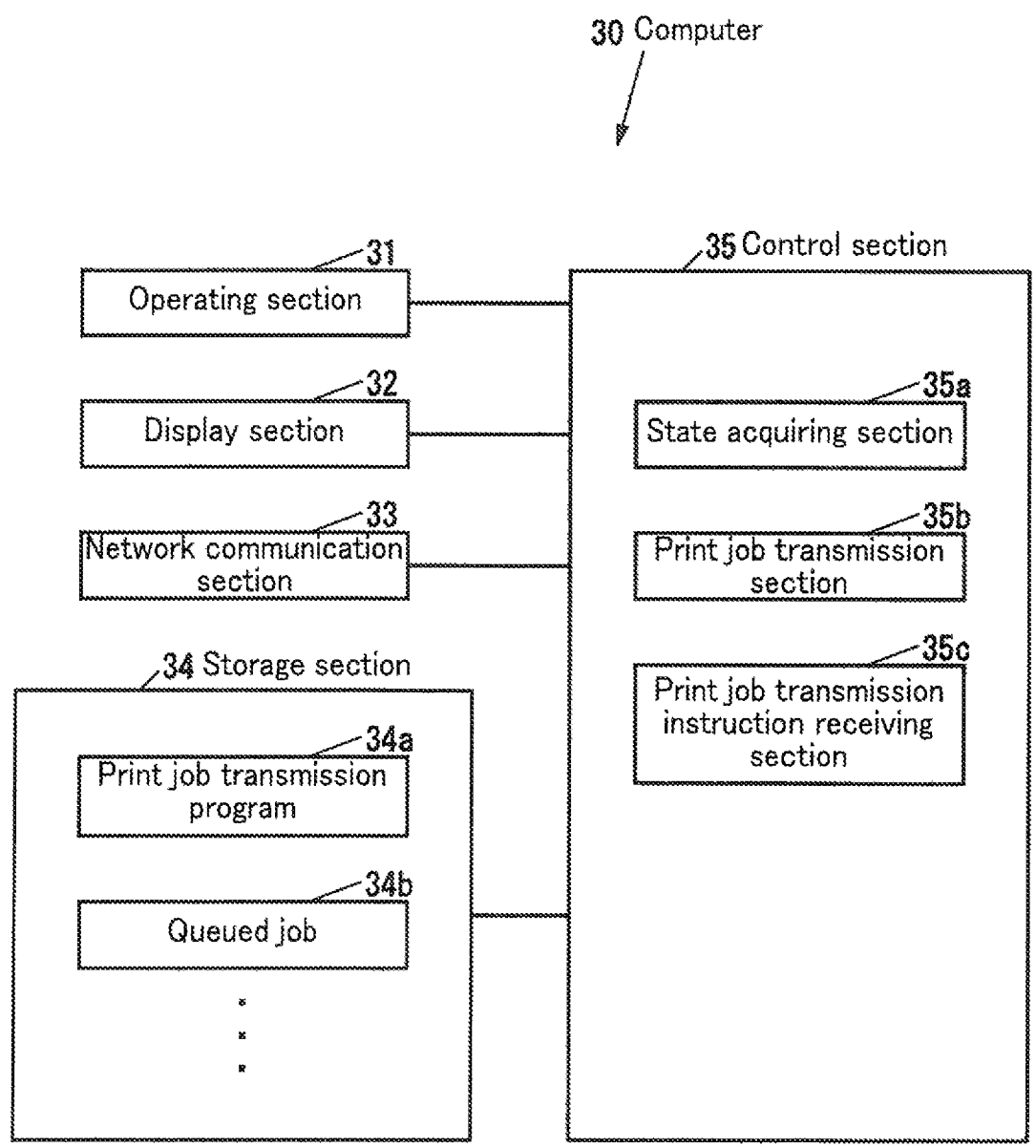
FIG. 3 shows a configuration of a computer shown in FIG. 1.

FIG. 3 shows a configuration of the computer 30. As shown in FIG. 3, the computer 30 includes an operating section 31, a display section 32, a network communication section 33, a storage section 34, and a control section 35.

The operating section 31 is an input device, such as a mouse, a keyboard, or the like. When the user manipulates the operating section 31, the computer 30 executes processing corresponding to the manipulation. The user can make the computer 30 to execute various types of processing through the operating section 31. The display section 32 is a display device, such as a LCD. The display device 32 displays a variety of information. The network communication section 33 is a network communication device that performs communication with an external device through the network 11 (see FIG. 1). The storage section 34 is a nonvolatile storage device, such as a HDD. The storage section 34 stores a program and various types of data. The control section 35 controls the entire computer 30.

The storage section 34 stores a print job transmission program 34a as a job transmission program. The print job transmission program 34a is a program for transmitting a print job to the MFP 20 (see FIG. 1). The print job transmission program 34a may be installed in the computer 30 from a non-transitory computer readable recording medium that records the print job transmission program 34a in the manufacturing stage of the computer 30. Alternatively, the print job transmission program 34a may be installed additionally in the computer 30 from a non-transitory computer readable recording medium that records the print job transmission program 34a. Or, the print job transmission program 34a recoded in a non-transitory computer readable recording medium may be installed additionally in the computer 30 through the network 11. Such a non-transitory computer readable recording medium may be a CD or DVD, for example.

The storage section 34 can store a queued job 34b. The queued job 34b is a data print job of which transmission to the MFP 20 is queued. Where a plurality of queued jobs 34b are stored in the storage section 34, the storage section 34 stores the queued jobs 34b in the queued order.

The control section 35 includes a CPU, a ROM, and a RAM, for example. The ROM stores a program and various types of data. The RAM is used as a work area for the CPU. The CPU executes a program stored in the ROM or the storage section 34.

The control section 35 executes the print job transmission program 34a stored in the storage section 34 to function as a state acquiring section 35a, a print job transmission section 35b (job transmission section), and a print job transmission instruction receiving section 35c (transmission instruction receiving section). The state acquiring section 35a acquires the state of the MFP 20. The print job transmission section 35b transmits a print job to the MFP 20. The print job transmission instruction receiving section 35c receives a transmission instruction of a print job.

An operation of the image forming system 10 will be described next.

Figure 4:
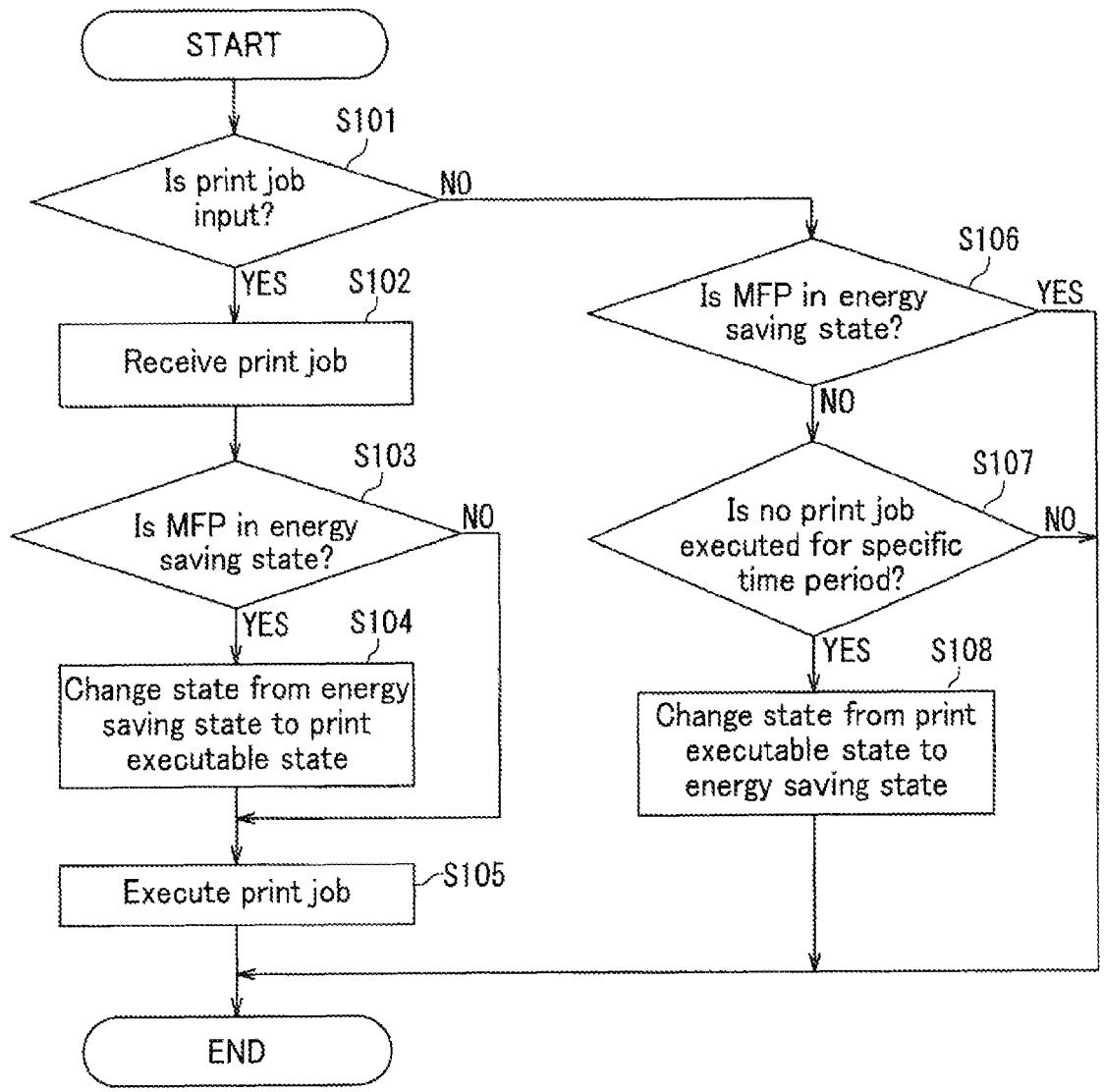
FIG. 4 depicts an operation of the MFP shown in FIG. 2.

First of all, an operation of the MFP 20 will be discussed. The control section 28 of the MFP 20 repeats the operation shown in FIG. 4 periodically. FIG. 4 depicts an operation of the MFP 20.

As shown in FIG. 4, the job receiving section 28a of the control section 28 determines whether or not a print job is input (S101). As the print job, a copy print job, a fax print job, a data print job, or the like is input. The copy print job is input through the operating section 21. The fax print job is input through the facsimile communication section 25. The data print job is input through the network communication section 26.

Upon determination that the print job is input (YES in S101), the job receiving section 28a receives the input print job (S102).

Next, the job executing section 28b of the control section 28 determines whether or not the MFP 20 is in the energy saving state (S103).

Upon determination that the MFP 20 is in the energy saving state (YES in S103), the job executing section 28b changes the state of the MFP 20 from the energy saving state to the print job executable state (S104). It is noted that the print job received in S102 may be any of all types of print jobs, such as a copy print job, a fax print job, data print job, etc. Examples of the data print job may include a data print job transmitted from the computer 30 and a data print job transmitted from a computer other than the computer 30.

When it is determined that the MFP 20 is not in the energy saving state (NO in S103), or the processing in S104 is terminated, the job executing section 28b executes the print job received in S102 (S105).

On the other hand, when the job receiving section 28a determines that no print job is input (NO in S101), the job executing section 28b determines whether or not the MFP 20 is in the energy saving state (S106).

Upon determination that the MFP 20 is not in the energy saving state (NO in S106), the job executing section 28b determines whether or not no print job is executed for a specific time period (S107).

When the job executing section 28b determines that no job is executed for the specific time period (YES in S107), the control section 28 changes the state of the MFP 20 from the print job executable state to the energy saving state (S108).

After execution of the processing in S105 or S108, the control section 28 terminates the operation shown in FIG. 4. Further, when it is determined that the MFP 20 is in the energy saving state (YES in S106) or that any print job is executed in the specific time period (NO in S107), the control section 28 terminates the operation shown in FIG. 4. As described above, the operation shown in FIG. 4 is repeated periodically.

Description will be made next about an operation of the computer 30 when a transmission instruction of a data print job is input.

The print job transmission instruction receiving section 35c of the control section 35 in the computer 30 is capable of receiving through the operating section 31 setting information indicative of whether or not a data print job to be transmitted to the MFP 20 is set as an energy saving job. The energy saving job is a print job that can save power consumption in the MFP 20.

Figure 5:
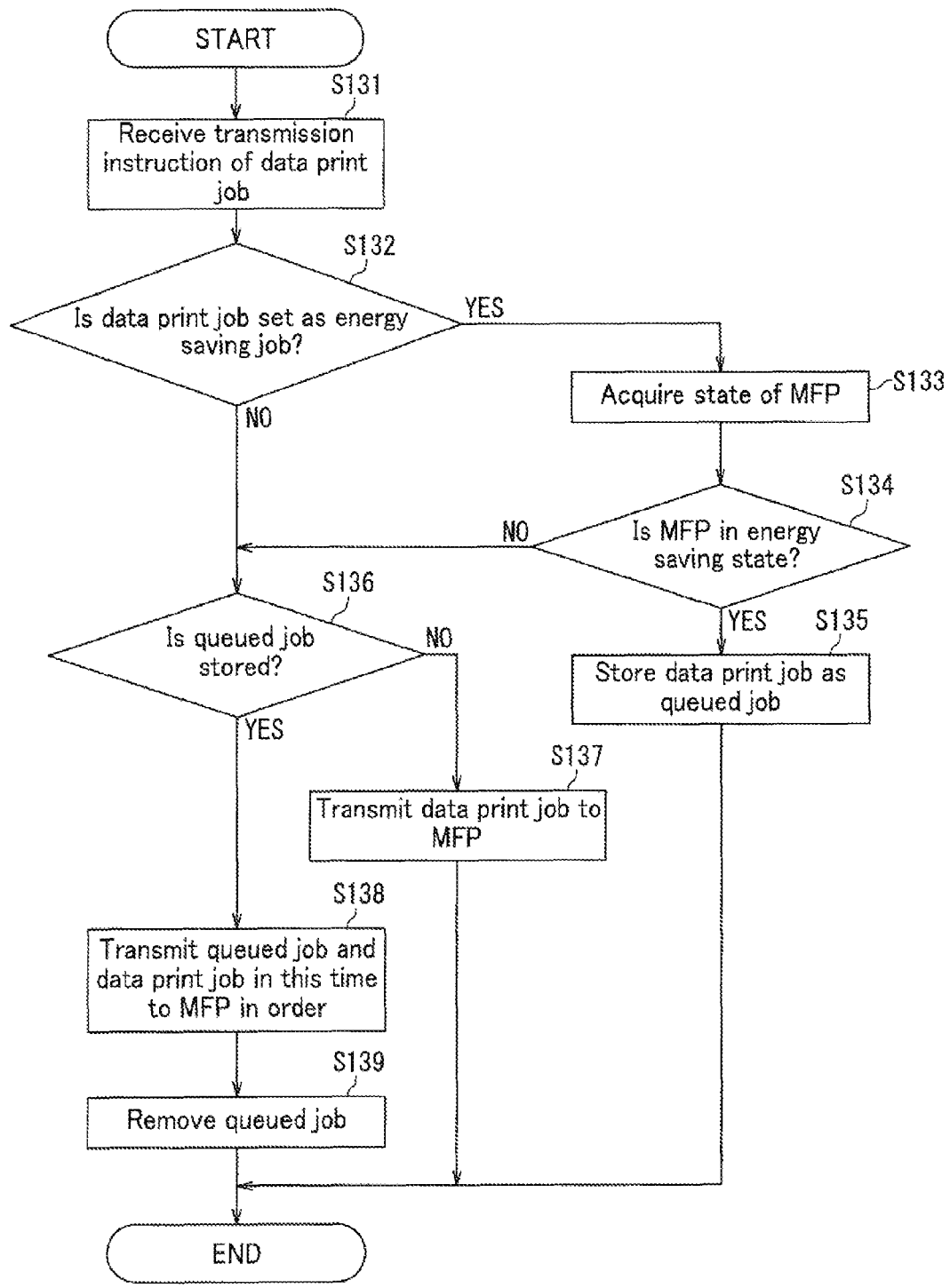
FIG. 5 depicts an operation of the computer in FIG. 3 where a transmission instruction of a data print job is input.

When a transmission instruction of a data print job to the MFP 20 is input through the operating section 31, the control section 35 executes the operation shown in FIG. 5. FIG. 5 depicts an operation of the computer 30 when a transmission instruction of a data print job is input.

First, as shown in FIG. 5, the print job transmission instruction receiving section 35c of the control section 35 receives a transmission instruction of a data print job to the MFP 20 through the operating section 31 (S131).

Next, the print job transmission section 35b of the control section 35 determines whether or not the data print job of which transmission instruction is received in S131 is set as an energy saving job (S132).

When the print job transmission section 35b determines that the data print job is set as an energy saving job (YES in S132), the state acquiring section 35a of the control section 35 acquires the state of the MFP 20 from the MFP 20 through the network communication section 33 (S133).

Subsequently, the print job transmission section 35b determines whether or not the state of the MFP 20, which is acquired in S133, is the energy saving state (S134).

Upon determination that the MFP 20 is in the energy saving state (YES in S134), the print job transmission section 35b causes the storage section 34 to store as a queued job 34b the data print job of which transmission instruction is received in S131 (S135). At this time, if another queued job 34b for the MFP 20 is already stored in the storage section 34, the print job transmission section 35b causes the storage section 34 to store the queued job 34b to be stored newly in the storage section 34 after the queued job 34b already stored in the storage section 34.

Upon determination that the data print job of which transmission instruction is received in S131 is not set as an energy saving job (NO in S132) or that the MFP 20 is not in the energy saving state (NO in S134), the print job transmission section 35b determines whether or not any queued jobs 34b for the MFP 20 are stored in the storage section 34 (S136).

Upon determination that no queued job 34b is stored in the storage section 34 (NO in S136), the print job transmission section 35b transmits the data print job of which transmission instruction is received in S131 to the MFP 20 through the network communication section 33 (S137). Accordingly, the MFP 20 executes the data print job received from the computer 30 through the network communication section 26, as described with reference to FIG. 4 (S105). When the MFP 20 is in the energy saving state (YES in S103), the state of the MFP 20 is changed from the energy saving state to the print job executable state (S104). Then, the data print job is executed (S105).

Further, upon determination that a queued job 34b is stored in the storage section 34 (YES in S136), as shown in FIG. 5, the print job transmission section 35b transmits the queued job 34b for the MFP 20 that is stored in the storage section 34 and the data print job of which transmission instruction is received in S131 in the queued order to the MFP 20 through the network communication section 33 (S138).

Thereafter, the print job transmission section 35b removes from the storage section 3 the queued job 34b transmitted to the MFP 204 (S139). Accordingly, as described with reference to FIG. 4, the MFP 20 executes a plurality of data print jobs received from the computer 30 through the network communication section 26 in the exact order of receipt (S105). When the MFP 20 is in the energy saving state (YES in S103), the state of the MFP 20 is changed from the energy saving state to the print job executable state (S104). Then, the plurality of data print jobs are executed in the order of receipt (S105).

After execution of the processing in S135, S137, or S139, the control section 35 of the computer 30 terminates the operation shown in FIG. 5.

Figure 6:
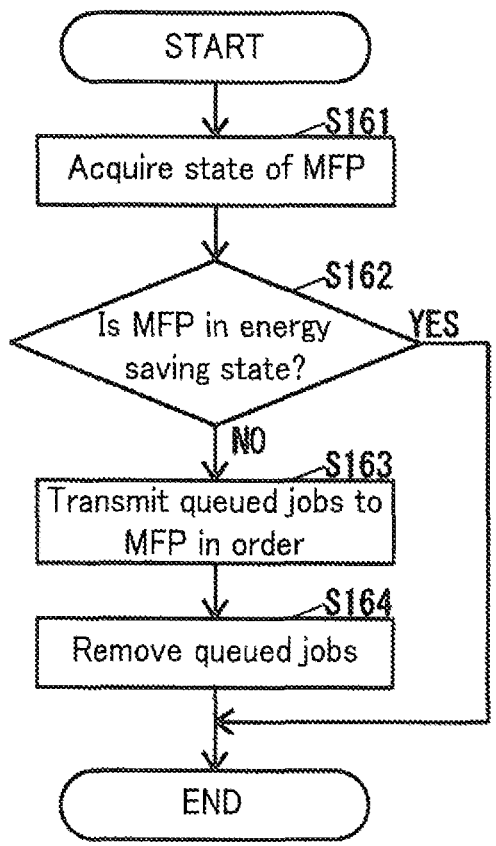
FIG. 6 depicts an operation of the computer in FIG. 3 when a queued job is stored.

Description will be made next about an operation of the computer 30 when a plurality of queued jobs 34b for the MFP 20 are stored in the storage section 34. Where a plurality of queued jobs 34b for the MFP 20 are stored in the storage section 34, the control section 35 executes the operation shown in FIG. 6. FIG. 6 depicts an operation of the computer 30 when a plurality of queued jobs 34b for the MFP 20 are stored in the storage section 34.

As shown in FIG. 6, the state acquiring section 35a acquires the state of the MFP 20 first from the MFP 20 through the network communication section 33 (S161).

Subsequently, the print job transmission section 35b determines whether or not the state of the MFP 20, which is acquired in S161, is the energy saving state (S162).

Upon determination that the MFP 20 is not in the energy saving state (NO in S162), the print job transmission section 35b transmits the queued jobs 34b stored in the storage section 34 in the queued order to the MFP 20 through the network communication section 33 (S163). Then, the print job transmission section 35b removes from the storage section 34 the queued jobs 34b transmitted to the MFP 20 (S164). Accordingly, as described with reference to FIG. 4, the MFP 20 executes the data print jobs received from the computer 30 through the network communication section 26 in the order of receipt (S105).

Upon determination that the MFP 20 is in the energy saving state (YES in S162), or upon execution of the processing in S164, the control section 35 terminates the operation shown in FIG. 6.

As described above, upon receipt of an energy saving job transmission instruction when the MFP 20 is in the energy saving state, the print job transmission program 34a allows the storage section 27 to store the energy saving job(s) as queued job(s) 34b (S131-S135 in FIG. 5). Accordingly, no energy saving job is transmitted to the MFP 20 during the time when the MFP 20 is in the energy saving state. This can reduce transition from the energy saving state to the print job executable state in the MFP 20 (S104 in FIG. 4). Thus, the print job transmission program 34a can reduce frequent transition between the print job executable state and the energy saving state in the MFP 20. As a result, energy consumption in the MFP 20 can be reduced.

Detailed description will be made here about a scheme to reduce energy consumption in the MFP 20.

Figure 7A:
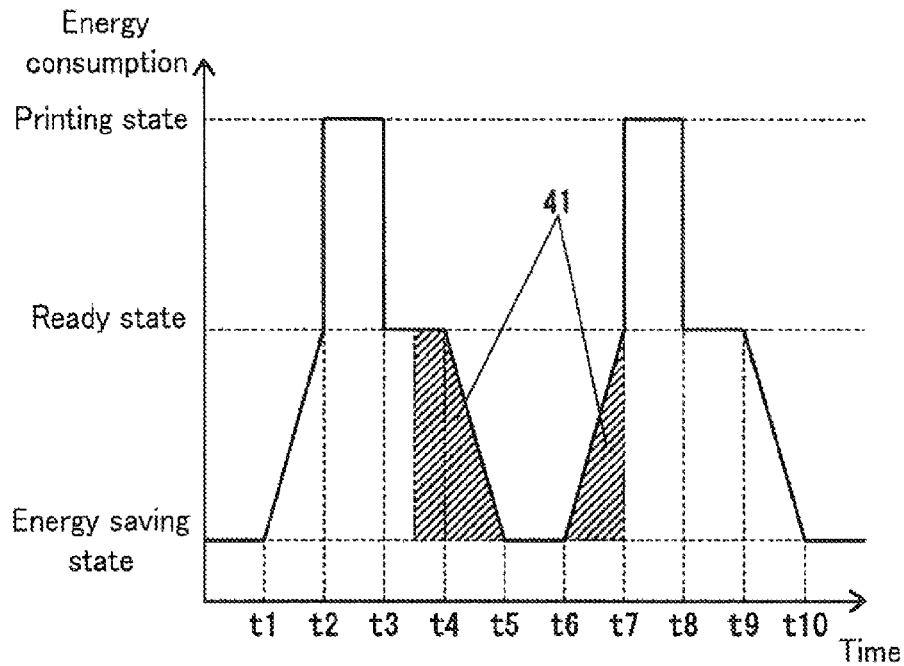
FIG. 7A shows one example of power consumption in the MFP in FIG. 2 when a print job is transmitted from a general computer.
Figure 7B:
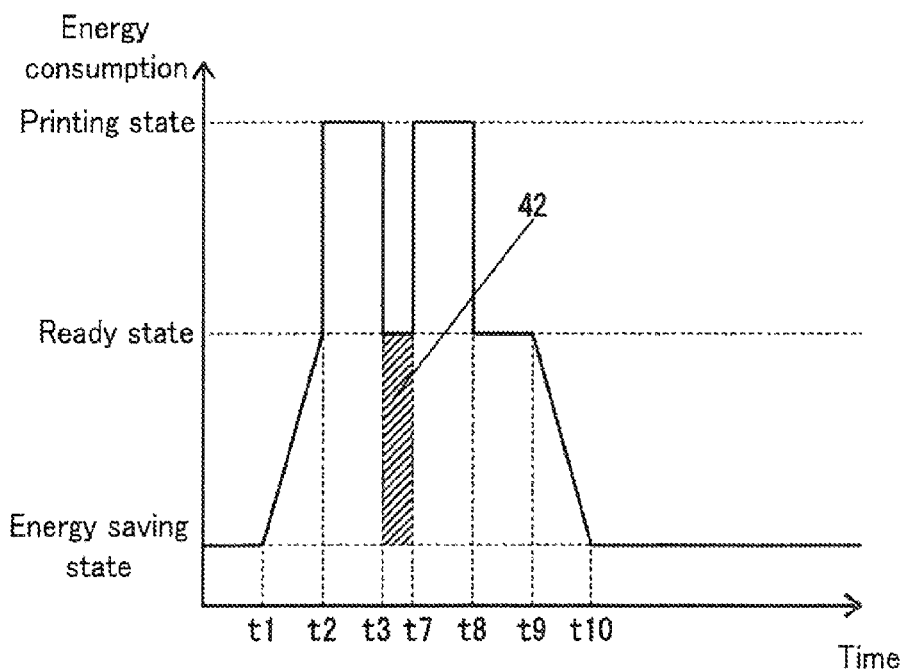
FIG. 7B shows one example of power consumption in the MFP in FIG. 2 when a print job is transmitted from the computer shown in FIG. 3.

FIG. 7A shows one example of power consumption in the MFP 20 when print jobs are transmitted from a general computer. In order to execute two print jobs received from the general computer in succession, the state of the MFP 20 is changed from the print job executable state to the energy saving state after the first print job is executed. Next, the state of the MFP 20 is changed again from the energy saving state to the print job executable state. Then, the MFP 20 executes the second print job. FIG. 7B shows one example of power consumption in the MFP 20 when print jobs are transmitted from the computer 30. In order to execute two print jobs received from the computer 30 in succession, the first print fob is executed. Then, the second job is executed before the state of the MFP 20 is changed from the print job executable state to the energy saving state.

In FIGS. 7A and 7B, the horizontal axis indicates time, while the vertical axis indicates consumed power. Further, in FIGS. 7A and 7B, time t1 indicates a time point when transition from the energy saving state to a ready state starts in the MFP 20 for execution of the first print job. Time t2 indicates a time point when the MFP 20 in the ready state starts executing the first print job. Time t3 indicates a time point when the MFP 20 terminates execution of the first print job. Time t4 indicates a time point when transition from the ready state to the energy saving state starts in the MFP 20. Time t5 indicates a time point when transition from the ready state to the energy saving state is terminated in the MFP 20. Time t6 indicates a time point when transition from the energy saving state to the ready state starts in the MFP 20 for execution of the second print job. Time t7 indicates a time point when the MFP 20 in the ready state starts executing the second print job. Time t8 indicates a time point when the MFP 20 terminates execution of the second print job. Time t9 indicates a time point when transition from the ready state to the energy saving state starts in the MFP 20. Time t10 indicates a time point when transition from the ready state to the energy saving state is terminated in the MFP 20.

The total power consumption in the MFP 20 shown in FIG. 7B is smaller by a hatched part 41 in FIG. 7A than the total power consumption in the MFP 20 shown in FIG. 7A. Further, the ready state intervenes between execution of the first print job and execution of the second print job in the example shown in FIG. 7B. By contrast, the MFP 20 may execute the first and second print jobs continuously without intervention of the ready state between the first and second print jobs. This can further reduce the total power consumption by a hatched part 42 in FIG. 7B. It is noted that FIGS. 7A and 7B each show the case where two print jobs are executed. The larger the number of print jobs is, the larger reduction in total power consumption is.

As has been described so far, in executing a plurality of print jobs, the MFP 20 can execute each print job with timing that causes less frequent transition between the print job executable state and the energy saving state. Thus, the total power consumption can be reduced.

When the MFP 20 is in the print job executable state (NO in S134) in the presence of a queued energy saving job (queued job 34b) (YES in S136), as shown in FIG. 5, the print job transmission program 34a allows transmission of the queued energy saving job to the MFP 20 together with a data print job of which transmission instruction is received in S131 (S138). Further, when the MFP 20 is in the print job executable state (NO in S162) in the presence of a queued energy saving job (queued job 34b), as shown in FIG. 6, the print job transmission program 34a allows transmission of the queued energy saving job to the MFP 20 (S163). Accordingly, the print job transmission program 34a allows transmission of the plurality of print jobs in a group to the MFP 20, so that MFP 20 can execute the plurality of print jobs continuously. As a result, the total power consumption in the MFP 20 can be reduced.

Furthermore, even if a data print job of which transmission instruction to the MFP 20 is received is an energy saving job (YES in S132), as shown in FIG. 5, when the MFP 20 is in the print job executable state (NO in S134), the print job transmission program 34a allows immediate transmission of the energy saving job to the MFP 20 (S137 or S138). This can reduce the possibility that the state of MFP 20 is once changed from the print job executable state to the energy saving state before the MFP 20 executes the energy saving job. Thus, the print job transmission program 34a can reduce frequent transition between the print job executable state and the energy saving state in the MFP 20. As a result, energy consumption in the MFP 20 can be reduced.

Furthermore, when a queued energy saving job (queued job 34b) is present (YES in S136) upon receipt of a transmission instruction of a non-energy saving job as a print job rather than an energy saving job (NO in S132), the print job transmission program 34a allows transmission of the queued energy saving job and the non-energy saving job in this order (S138). Thus, the MFP 20 can execute the print jobs in this order. As a result, the MFP 20 can execute the print jobs in the order according to the user's intention.

Second Embodiment

First, an image forming system according to the second embodiment of the present disclosure will be described. It is noted that in the image forming system according to the second embodiment, the same reference numerals as those in the image forming system 10 according to the first embodiment (see FIG. 1) denote the same elements of the image forming system 10 according to the first embodiment, and detailed description of them is omitted.

Figure 8:
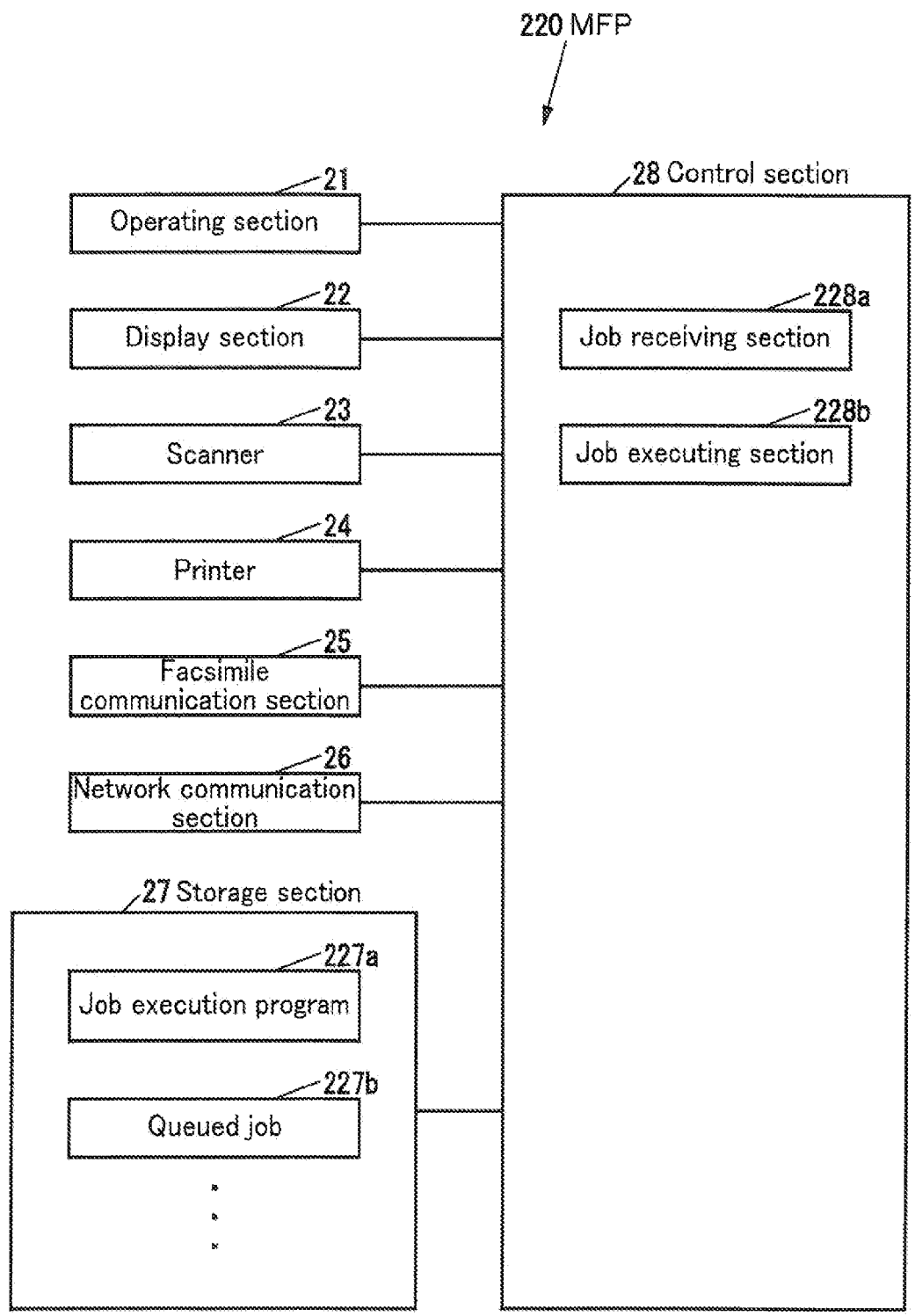
FIG. 8 shows a configuration of an MFP according to the second embodiment of the present disclosure.
Figure 9:
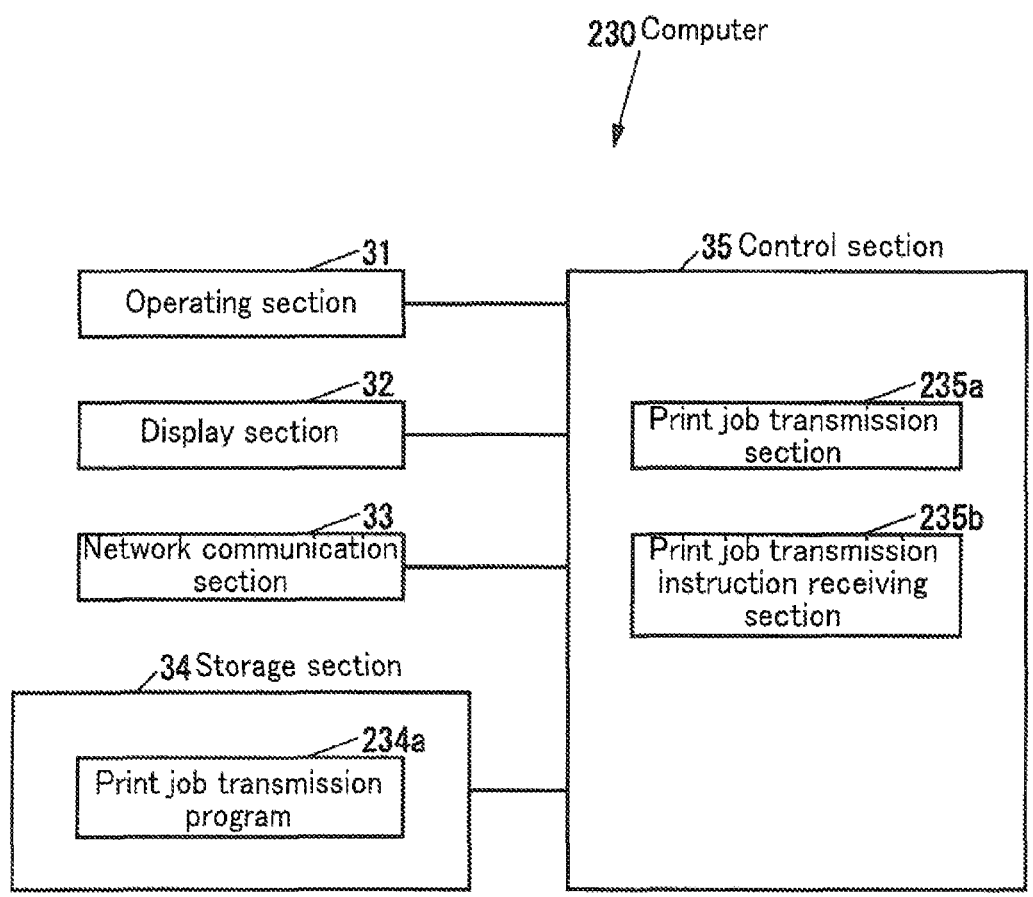
FIG. 9 shows a configuration of a computer according to the second embodiment of the present disclosure.

FIG. 8 shows a configuration of an MFP 220. FIG. 9 shows a configuration of a computer 230. The configuration of the image forming system according to the second embodiment is the same as that of the image forming system 10 except that the MFP 20 (see FIG. 1) and the computer 30 (see FIG. 1) are replaced by an MFP 220 (see FIG. 8) as an electronic device and a computer 230 (see FIG. 9), respectively.

As shown in FIG. 8, the configuration of the MFP 220 is the same as that of the MFP 20 (see FIG. 2) except information stored in the storage section 27 and functions that the control section 28 realizes.

The storage section 27 stores a job execution program 227a for job execution. The job execution program 227a may be installed in the MFP 220 from a non-transitory computer readable recording medium that records the job execution program 227a in the manufacturing stage of the MFP 220. Alternatively, the job execution program 227a recorded on a non-transitory computer readable recording medium may be installed additionally in the MFP 220 through a storage medium, such as a USB memory, an SD card, etc. Or, the job execution program 227a recorded on a non-transitory computer readable recording medium may be installed additionally in the MFP 220 through the network 11 (see FIG. 1). Such a non-transitory computer readable recording medium may be a CD or DVD, for example.

The storage section 27 stores queued jobs 227b in the queued order as data print jobs of which execution is queued.

The control section 28 executes the job execution program 227a stored in the storage section 27 to function as a job receiving section 228a and a job executing section 228b. The job receiving section 228a receives a job. The job executing section 228b executes a job.

As shown in FIG. 9, the configuration of the computer 230 is the same as that of the computer 30 (see FIG. 3) except information stored in the storage section 34 and functions that the control section 35 realizes.

The storage section 34 stores a print job transmission program 234a for allowing a print job to be transmitted to the MFP 220 (See FIG. 8). The print job transmission program 234a may be installed in the computer 230 from a non-transitory computer readable recording medium that records the print job transmission program 234a in the manufacturing stage of the computer 230. Alternatively, the print job transmission program 234a may be installed additionally in the computer 230 from a non-transitory computer readable recording medium that records the print job transmission program 234a. Or, the print job transmission program 234a recoded on a non-transitory computer readable recording medium may be installed additionally in the computer 230 through the network 11 (see FIG. 1). Such a non-transitory computer readable recording medium may be a CD or DVD, for example.

The control section 35 executes the print job transmission program 234a stored in the storage section 34 to function as a print job transmission section 235a and a print job transmission instruction receiving section 235b. The print job transmission section 235a transmits a print job to the MFP 220. The print job transmission instruction receiving section 235b receives a transmission instruction of a print job.

An operation of the image forming system according to the present embodiment will be described next.

Description will be made first about an operation of the computer 230 when a transmission instruction of a data print job is input.

The print job transmission instruction receiving section 235b of the control section 35 in the computer 230 is capable of receiving through the operating section 31 setting information indicative of whether or not a data print job to be transmitted to the MFP 220 is set as an energy saving job. The energy saving job is a print job that can save power consumption in the MFP 220.

Figure 10:
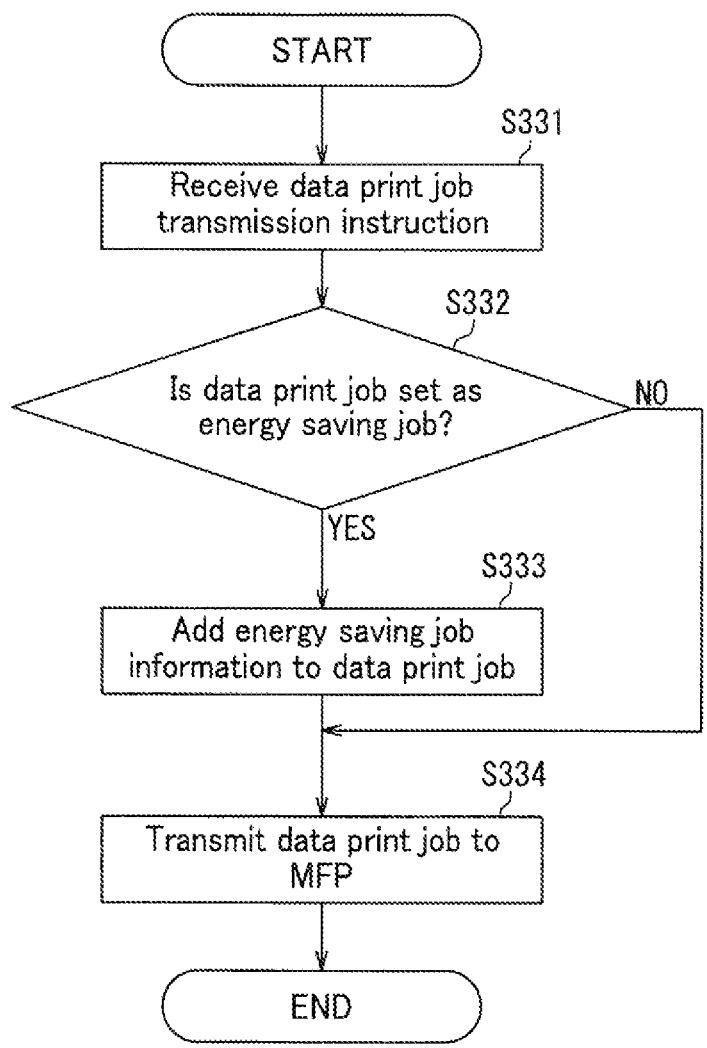
FIG. 10 depicts an operation of the computer in FIG. 9 when a transmission instruction of a data print job is input.

When a transmission instruction of a data print job to the MFP 220 is input through the operating section 31, the control section 35 executes the operation shown in FIG. 10. FIG. 10 depicts an operation of the computer 230 when a transmission instruction of a data print job is input.

As shown in FIG. 10, the print job transmission instruction receiving section 235b of the control section 35 receives through the operating section 31 a transmission instruction of a data print job to the MFP 220 (S331).

Next, the print job transmission section 235b of the control section 35 determines whether or not the data print job, of which transmission instruction is received in S331, is set as an energy saving job (S332).

Upon determination that the data print job is set as an energy saving job (YES in S332), the print job transmission section 235a adds energy saving job information to the data print job (S333). The energy saving job information indicates that the data print job is an energy saving job.

Upon determination that the data print job is not set as an energy saving job (NO in S332), or upon execution of the processing in S333, the print job transmission section 235a transmits the data print job to the MFP 220 through the network communication section 33 (S334). Then, the operation shown in FIG. 10 is terminated.

Figure 11A:
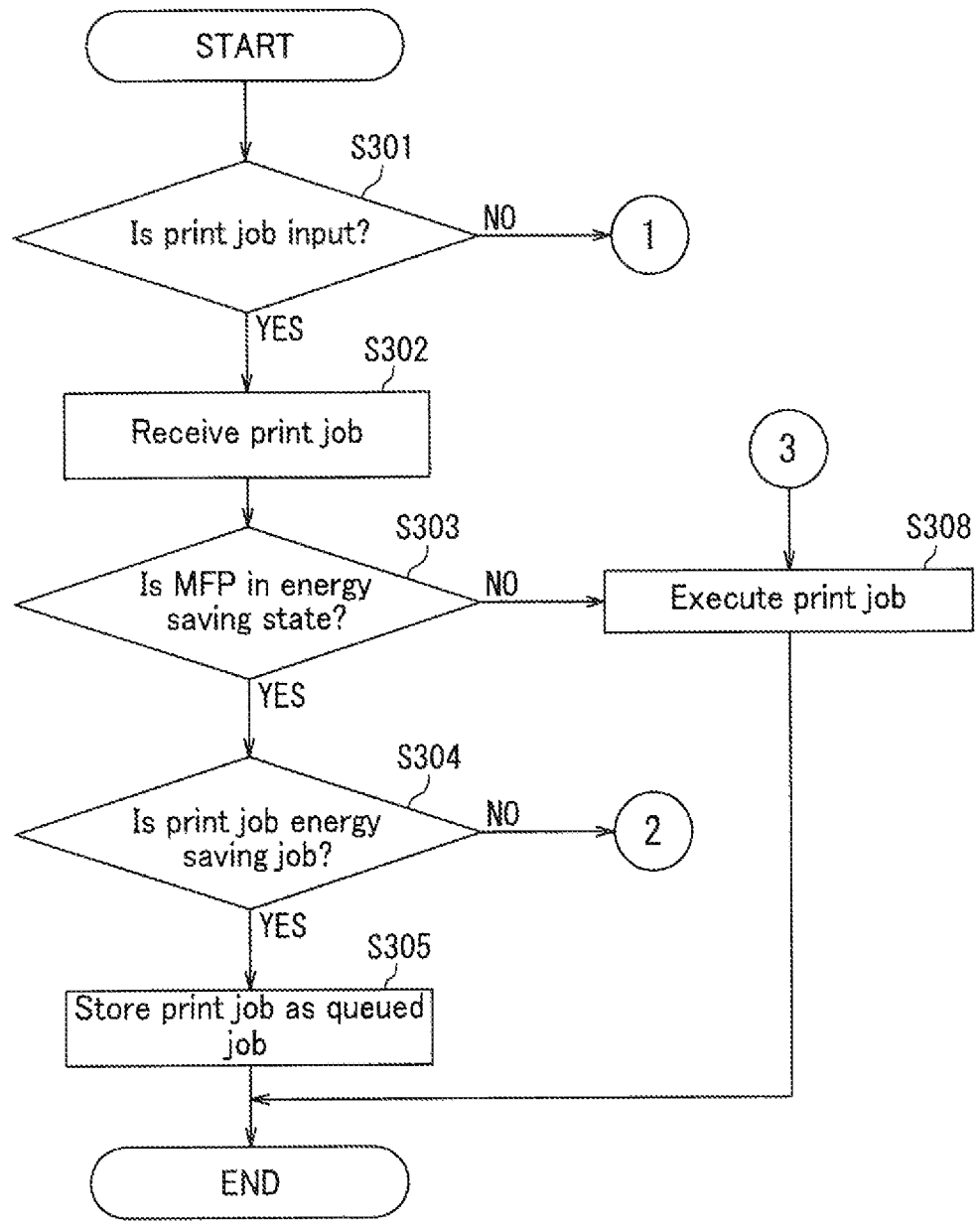
FIG. 11A depicts an operation of the MFP in FIG. 8.
Figure 11B:
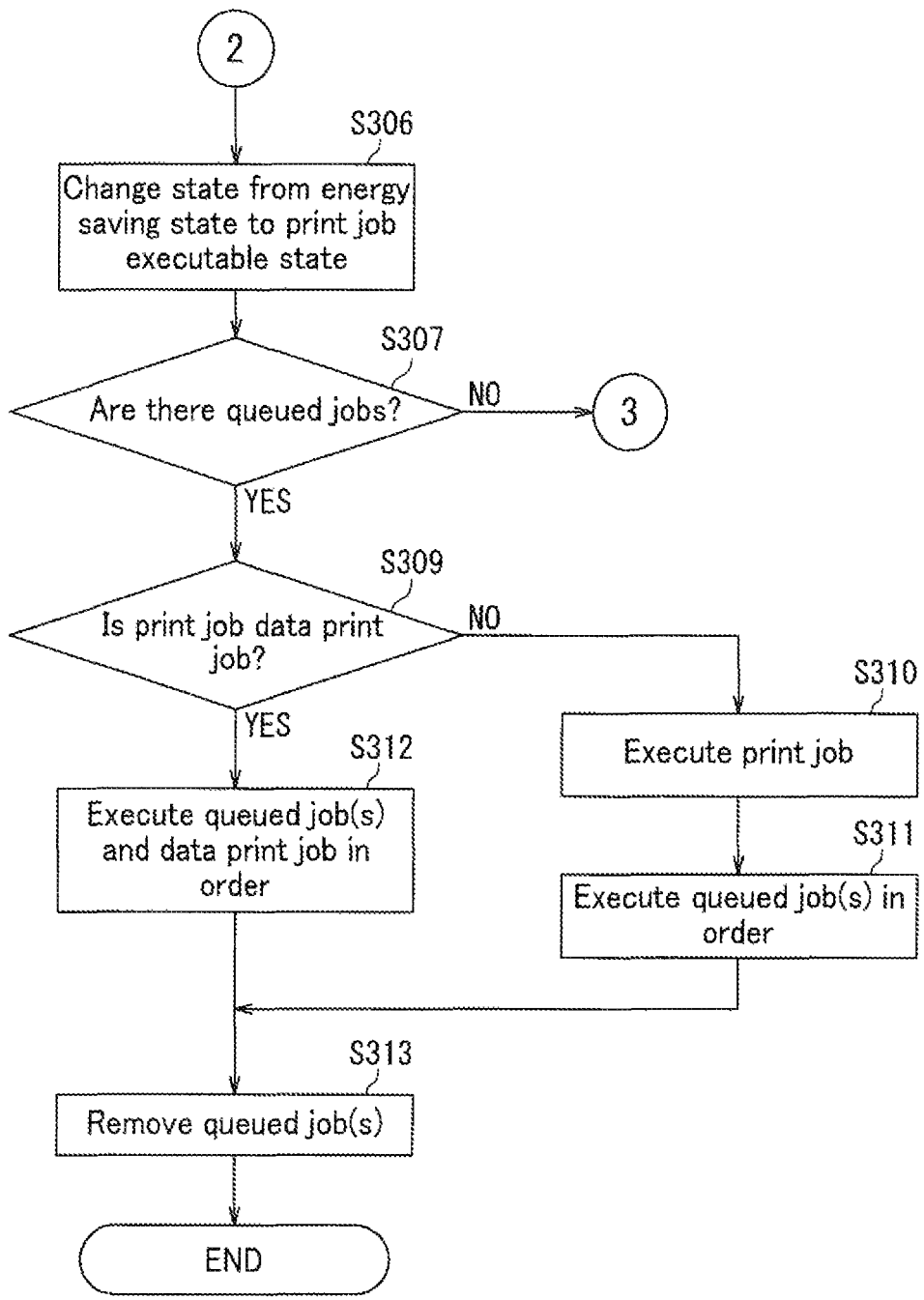
FIG. 11B depicts an operation of the MFP in FIG. 8.
Figure 11C:
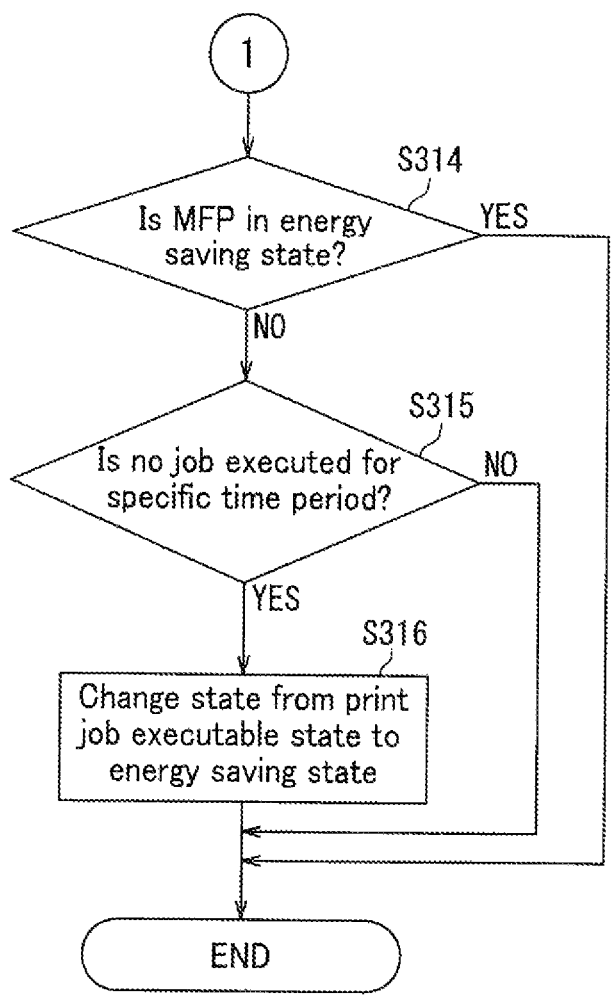
FIG. 11C depicts an operation of the MFP in FIG. 8.

Next, an operation of the MFP 220 will be described. The control section 28 of the MFP 220 repeats the operation shown in FIGS. 11A-11C periodically. FIGS. 11A-11C depict the operation of the MFP 220.

As shown in FIG. 11A, the job receiving section 228a of the control section 28 determines whether or not a print job is input (S301). As the print job, a copy print job, a fax print job, a data print job, or the like is input. The copy print job is input through the operating section 21. The fax print job is input through the facsimile communication section 25. The data print job is input through the network communication section 26.

Upon determination that a print job is input (YES in S301), the job receiving section 228a receives the input print job (S302).

Next, the job executing section 228b of the control section 28 determines whether or not the MFP 220 is in the energy saving state (S303).

Upon determination that the MFP 220 is in the energy saving state (YES in S303), the job executing section 228b determines whether or not the print job received in S302 is an energy saving job (S304). When the print job includes the energy saving job information, the job executing section 228b determines that the print job is an energy saving job.

Upon determination that the print job is an energy saving job (YES in S304), the job executing section 228b causes the storage section 27 to store the print job (energy saving job) received in S302 as a queued job 227b (S305). At this time, where another queued job 227b is already stored in the storage section 27, the job executing section 228b causes the storage section 27 to store the queued job 227b, which is to be newly stored in the storage section 27, after the queued job 227b that is already stored in the storage section 27.

Upon determination that the MFP 220 is not in the energy saving state (NO in S303), the job executing section 228b executes the print job received in S302 (S308).

When the processing in S305 or S308 is executed, the control section 28 terminates the operation shown in FIGS. 11A-11C.

Upon determination that the print job is not an energy saving job (NO in S304), as shown in FIG. 11B, the job executing section 228b changes the state of the MFP 220 from the energy saving state to the print job executable state (S306).

Subsequently, the job executing section 228b determines whether or not any queued jobs 227b are already stored in the storage section 27 (S307).

Upon determination that no queued job 227b is stored in the storage section 27 (NO in S307), the job executing section 228b executes the print job received in the S302, as shown in FIG. 11A (S308). Then, the operation in FIGS. 11A-11C is terminated.

Upon determination that any queued job(s) 227b is/are stored in the storage section 27 (YES in S307), the job executing section 228b determines whether or not the print job received in S302 is a data print job (S309).

Upon determination that the print job is not a data print job (NO in S309), the job executing section 228b executes the print job received in S302 (S310). Thereafter, the job executing section 228b executes the queued job(s) 227b stored in the storages section 27 in the queued order (S311).

Upon determination that the print job is a data print job (YES in S309), the job executing section 228b executes the queued job(s) 227b stored in the storage section 27 and the print job (data print job) received in S302 in the queued order (S312).

After execution of the processing in S311 or S312, the job executing section 228b removes the queued job(s) 227b from the storage section 27 (S313). After execution of the processing in S313, the control section 28 terminates the operation shown in FIGS. 11A-11C.

When the job receiving section 228a determines that no print job is input (NO in S301), the job executing section 228b determines whether or not the MFP 220 is in the energy saving state (S314), as shown in FIG. 11C.

Upon determination that the MFP 220 is not in the energy saving state (NO in S314), the job executing section 228b determines whether not no print job is executed for a specific time period (S315).

When the job executing section 228b determines that no print job is executed for the specific time period (YES in S315), the control section 28 changes the state of the MFP 220 from the print job executable state to the energy saving state (S316).

When the control section 28 executes the processing in S316, or it is determined that the MFP 220 is in the energy saving state (YES in S314) or that a print job is executed in the specific time period (NO in S315), the operation shown in FIGS. 11A-11C is terminated.

As described above, upon receipt of an energy saving job when the MFP 220 is in the energy saving state, the MFP 220 causes the storage section 27 to store the energy saving job as a queued job 227b (S301-S305). Thus, transition from the energy saving state to the print job executable state in the MFP 220 (S306) can be prevented. Accordingly, frequent transition between the print job executable state and the energy saving state in the MFP 220 can be reduced. This can enhance the energy saving performance of the MFP 220.

Further, when any queued energy saving job is present (YES in S307) in transition from the energy saving state to the print job executable state in the MFP 220 (S306), the MFP 220 executes this queued energy saving job (S311 or S312). Accordingly, the MFP 220 can execute a plurality of print jobs in a group, thereby achieving serial execution of the plurality of print jobs. As a result, the total power consumption in the MFP 220 can be reduced.

Moreover, when the MFP 220 is in the print job executable state (NO in S303), a data print job is executed immediately (S308) even if the received data print job is an energy saving job. This can reduce a possibility that the state of the MFP 220 is changed from the print job executable state to the energy saving state before execution of the energy saving job. Thus, frequent transition between the print job executable state and the energy saving state in the MFP 220 can be reduced. In turn, the energy saving performance of the MFP 220 can be enhanced.

Still further, when a queued energy saving job is present (YES in S307) upon receipt of a non-energy saving job as a print job rather than an energy saving job (NO in S304), the MFP 220 executes the queued energy saving job and the non-energy saving job in this order (S312). Accordingly, the MFP 220 can execute the print jobs in the order according to the user's intention.

It is noted that the electronic device in the present disclosure is an MFP in each embodiment. However, it may be any image forming apparatus other than the MFP, such as devices dedicated for printing, copying, faxing, etc. or an electronic device other than image forming apparatuses, as long as it is an electronic device of which state is changed from the job executable state, in which a received job is executable, to the energy saving state, in which power consumption is less than that in the job executable state, when no job is executed for a specific time period in the job executable state.

What is claimed is:

1. A non-transitory computer readable recording medium that stores a job transmission program that a computer executes, the job transmission program being a program for transmission of a job to an electronic device that includes a job executable state in which the job is executable and an energy saving state in which power consumption is less than that in the job executable state, the recording medium comprising, as processes that the computer executes:

receiving a transmission instruction of the job;

determining whether or not the job is set as an energy saving job that can save power consumption in the electronic device;

acquiring a state of the electronic device;

queuing, when the job is an energy saving job and the acquired state of the electronic device is the energy saving state, transmission of the energy saving job; and transmitting, when the job is a non-energy saving job other than an energy saving job in the presence of a queued energy saving job, the queued energy saving job to the electronic device and then transmitting the non-energy saving job to the electronic device, wherein each of the jobs are transmitted to the electronic device in an order in which the computer receives transmission instructions of the jobs.

2. The non-transitory computer readable recording medium according to claim 1, wherein when the job is an energy saving job, and the acquired state of the electronic device is the job executable state, the job transmission program allows the computer to execute the transmitting the energy saving job.

3. The non-transitory computer readable recording medium according to claim 2, wherein the computer further executes:

obtaining the state of the electronic device in the presence of a queued energy saving job; and transmitting the queued energy saving job to the electronic device when the obtained state of the electronic device is the job executable state.

4. An electronic device that includes a job executable state in which a job is executable and an energy saving state in which power consumption is less than that in the job executable state, the electronic device comprising:

a job receiving section configured to receive the job; and
a job executing section configured to execute the job,
wherein when the job receiving section receives an energy saving job that can save power consumption in the electronic device as the job where the electronic device is in the energy saving state, the job executing section queues execution of the energy saving job,
when the job receiving section receives as the job a non-energy saving job other than an energy saving job, the job executing section determines whether or not the non-energy saving job is a data print job,
when the job receiving section receives a data print job as the non-energy saving job in the presence of a queued energy saving job, the job executing section executes the queued energy saving job and then executes the non-energy saving job,
when the data receiving section receives as the non-energy saving job a job other than a data print job in the presence of a queued energy-saving job, the job executing section executes the non-energy saving job and then executes the queued energy saving job, and
when the energy receiving section receives the non-energy saving job as the job where the electronic device is in the energy saving state, a state of the electronic device is changed from the energy saving state to the job executable state.

5. The electronic device according to claim 4, wherein
when the job receiving section receives an energy saving job as the job where the electronic device is in the job executable state, the job executing section executes the energy saving job.

* * * * *